US006440895B1

(12) United States Patent
Tonkovich et al.

(10) Patent No.: US 6,440,895 B1
(45) Date of Patent: Aug. 27, 2002

(54) CATALYST, METHOD OF MAKING, AND REACTIONS USING THE CATALYST

(75) Inventors: Anna Lee Y. Tonkovich, Pasco; Yong Wang, Richland; Yufei Gao, Kennewick, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/492,950

(22) Filed: Jan. 27, 2000

Related U.S. Application Data

(63) Continuation-in-part of application No. 09/123,781, filed on Aug. 27, 1998.

(51) Int. Cl.[7] .............................. B01J 35/04; B01J 35/06
(52) U.S. Cl. ............. 502/439; 502/527.12; 502/527.13; 502/527.15; 502/527.24; 427/585
(58) Field of Search ..................... 502/439, 527.12, 502/527.13, 527.15, 527.24; 427/585

(56) References Cited

U.S. PATENT DOCUMENTS

| | | | |
|---|---|---|---|
| 3,829,888 A | * 8/1974 | Hashimoto et al. | |
| 3,873,469 A | 3/1975 | Foster et al. | 252/455 |
| 3,885,063 A | * 5/1975 | Schachner et al. | |
| 3,907,708 A | 9/1975 | Lacroix | 252/439 |
| 3,944,504 A | * 3/1976 | Ford et al. | |
| 4,062,808 A | * 12/1977 | Gandhi et al. | |
| 4,196,099 A | 4/1980 | Hunter et al. | 252/437 |
| 4,422,961 A | 12/1983 | Gray | 502/301 |
| 4,673,663 A | 6/1987 | Magnier | 502/320 |
| 4,686,202 A | * 8/1987 | Broecker | |
| 4,801,620 A | 1/1989 | Fujitani et al. | 518/715 |
| 4,806,427 A | 2/1989 | Stein et al. | 502/60 |
| 4,935,392 A | 6/1990 | Kainer et al. | 502/60 |
| 4,945,116 A | 7/1990 | Abrevaya | 518/715 |
| 4,975,406 A | 12/1990 | Frestad et al. | 502/302 |
| 4,985,230 A | 1/1991 | Baden et al. | 423/650 |
| 4,985,371 A | * 1/1991 | Rana et al. | |
| 5,023,276 A | 6/1991 | Yarrington et al. | 514/703 |
| 5,047,381 A | * 9/1991 | Beebe | |
| 5,154,970 A | * 10/1992 | Kaplan et al. | |
| 5,227,407 A | 7/1993 | Kim | 518/700 |
| 5,422,331 A | 6/1995 | Galligan et al. | 502/333 |
| 5,440,872 A | * 8/1995 | Pfefferle | |
| 5,461,022 A | 10/1995 | Dosch et al. | 502/242 |
| 5,480,622 A | * 1/1996 | Narula et al. | |
| 5,545,674 A | 8/1996 | Behrmann et al. | 518/715 |
| 5,552,360 A | * 9/1996 | Farrauto et al. | |

(List continued on next page.)

FOREIGN PATENT DOCUMENTS

| | | | | |
|---|---|---|---|---|
| EP | 0 574 012 | 6/1993 | | 37/2 |
| EP | 0 665 047 | 8/1995 | | 53/94 |
| EP | 0 716 877 | 12/1995 | | 53/94 |
| EP | 0 869 842 | 10/2001 | | 8/2 |
| RU | 2093261 | 10/1997 | | 23/75 |
| RU | 2118724 | 10/1997 | | 23/75 |
| WO | WO 98/07377 | 6/1990 | | 23/89 |
| WO | WO 98/38147 | 9/1998 | | 1/4 |
| WO | WO 00/06301 | 2/2000 | | 37/2 |
| WO | WO 01/51414 | 7/2001 | | 3/40 |
| WO | WO 01/96234 | 12/2001 | | 3/38 |

OTHER PUBLICATIONS

Merriam–Webster's Collegiate Dictionary. Tenth Edition. C. 1999. pp. 428 and 728–729.*
Research Disclosure "Full Range Liquid Sensor", p. 32356. 1991.
Research Disclosure "Honeycomb–Supported Fischer–Tropsch Catalyst", p. 32357. 1991.
T Inui et al., "*Catalytic Combustion of Natural Gas As The Role Of On–Site Heat Supply in Rapid Catalytic $CO_2$–$H_2O$ Reforming of Methane*", p. 295–302. 1995.
ZR Ismagilov et al., "*Development and Study of Metal Foam Heat–Exchanging Tubular Reactor: Catalytic Combustion of Methane Combined With Methane Steam Reforming*", p. 2759–2764. 2000.
JR Kosak, "*A Novel Fixed Bed Catalyst For The Direct Combination Of $H_2$ and $O_2$ to $H_2O_2$*", p. 115–124. 1995.
Adris et al, On the Reported Attempts to Radically Improve the Performance of the Steam Methane Reforming Reactor, *The Canadian Journal of Chemical Engineering*, Apr., 1996, vol. 74, pp. 177–186.
Pestryakov et al, Foam Metal Catalysts with Intermediate Support for Deep Oxidation of Hydrocarbons, *React. Kinet. Catal. Lett.*, 1994, vol. 53, No. 2, 347–352.
Pestryakov et al, Metal–Foam Catalysts with Supported Active Phase for Deep Oxidation of Hydrocarbons, *React. Kinet. Catal. Lett.*, 1995, vol. 54, No. 1, 167–172.
John R. Kosak, A Novel Fixed Bed Catalyst for the Direct Combination of H2 and O2 to H2O, 1995, 115–124.
Podyacheva et al., Metal Foam Supported Perovskite Catalysts, *React. Kinet. Catal. Lett.*, 1997, vol. 60, No. 2, 243–250.
Leonov et al., Monolithic Catalyst Supports with Foam Structure, *React. Kinet. Catal. Lett.*, 1997, vol. 70, No. 2, 259–267.
Twigg et al., Metal and Coated–Metal Catalysts, 59–90.
Hagendorf, U. "*A $Pt/Al_2O_3$ Coated Microstructured Reactor/Heat Exchanger for the Controlled $H_2/O_2$–Reaction in the Explosion Regime.*" p. 81–87. 1997.
Mulder, A. "*Catalytic Combustion in a Sintered Metal Reactor With Integrated Heat Exchanger.*" p. 825–836. 1997.

Primary Examiner—Steve P. Griffin
Assistant Examiner—Christina Ildebrando
(74) *Attorney, Agent, or Firm*—Frank Rosenberg

(57) ABSTRACT

The present invention includes a catalyst having a layered structure with, (1) a porous support, (2) a buffer layer, (3) an interfacial layer, and optionally (4) a catalyst layer. The invention also provides a process in which a reactant is converted to a product by passing through a reaction chamber containing the catalyst.

42 Claims, 3 Drawing Sheets

U.S. PATENT DOCUMENTS

| | | | |
|---|---|---|---|
| 5,690,900 A | | 11/1997 | Smojver ..................... 423/392 |
| 5,866,734 A | * | 2/1999 | Flick et al. |
| 5,888,456 A | * | 3/1999 | Hashimoto et al. |
| 6,040,266 A | * | 5/2000 | Fay, III et al. |
| 6,168,765 B1 | | 1/2001 | Romatier et al. ........... 422/200 |
| 6,211,113 B1 | * | 4/2001 | Harth et al. |
| 6,211,255 B1 | | 4/2001 | Schanke et al. ............ 518/715 |
| 6,228,341 B1 | | 5/2001 | Hebert et al. ............... 423/352 |
| 6,262,131 B1 | | 7/2001 | Arcuri et al. ............... 518/700 |
| 6,274,101 B1 | | 8/2001 | Sechrist ...................... 422/198 |

* cited by examiner

CATALYST, METHOD OF MAKING, AND REACTIONS USING THE CATALYST

RELATED APPLICATIONS

This application is a continuation-in-part of U.S. Ser. No. 09/123,781 filed Aug. 27, 1998 pending which is incorporated by reference.

This invention was made with Government support under Contract DE-AC0676RL01830 awarded by the U.S. Department of Energy. The Government has certain rights in the invention.

FIELD OF THE INVENTION

The present invention relates to a catalyst having a porous support, buffer layer and interfacial layer; methods of making the catalyst; and catalytic processes utilizing the catalyst.

BACKGROUND OF THE INVENTION

Hydrogen and hydrocarbon conversion reactions including such as steam reforming, water-gas shift reactions, methanol synthesis and catalytic combustion are well known. These reactions are usually carried out at temperatures between 150 and 1000° C. Currently these reactions are industrially run using catalyst pellets which consist of an active catalytic metal or metal oxide deposited on high surface area ceramic pellets.

Foam or monolith catalysts are known that have three layers (1) porous support, (2) interfacial layer, and (3) catalyst metal as described in [1]. In making these catalysts, the interfacial layer has been deposited by various methods including solution impregnation techniques. The catalyst layer may be deposited by solution impregnation techniques. The interfacial layer has greater surface area than the porous support whereas the porous support has greater mechanical strength than the interfacial layer.

The porous support may be a metal or ceramic foam. Metal foams are highly thermally conductive and easy to machine. The sponge-like mechanical properties allow convenient sealing in a reaction chamber via mechanical contact. The closely matched thermal expansion between the metal foam and the housing reaction chamber minimizes cracking of the porous support and minimizes gas channeling around the porous support at higher reaction temperatures. Pestryakov et al prepared metal foam supported transition metal oxide catalysts with [1] and without [2] an intermediate gamma-alumina layer for the oxidation of n-butane. Kosak [3] examined several approaches to disperse precious metals on various metal foams where the surface was pre-etched with HCl solution, and reported that electroless deposition provides the best adhesion of precious metals to the foam supports. Podyacheva et al. [4] also synthesized foam metal supported $LaCoO_3$ perovskite catalyst with a porous alumina intermediate for methane oxidation. Despite all of the potential advantages with metal foam supported catalysts, metal foam has low corrosion resistance and its nonporous and smooth web surfaces have provided poor adhesion to ceramic materials, and these materials are prone to spalling of interfacial layers after thermal cycling because of the mismatch in thermal expansion.

In order to increase corrosion resistance, methods such as diffusion alloying with Al, Cr, and Si have been used to fabricate ferritic steels, which are typically used for the manufacturing of high temperature furnace elements (about 1200° C.) [5]. When the aluminum containing ferritic steels are appropriately heat-treated, aluminum migrates to the alloy surface and forms a strongly adhering oxide film which is resistant to oxygen diffusion. Such ferritic steel foils have been used to fabricate metal monoliths with >10 ppi (pores per inch) open cells [6]. However, the search for the similar alloy foams with pores suitable for catalytic applications (<20 ppi, 80 ppi preferred) has been fruitless. This has been attributed to both the immature methods for making the finer Al-ferritic steel foams and the lack of the alloy precursors for making the foams.

Hence, there is a need in the art of supported catalysts for a porous support of a foam that is resistant to corrosion or oxidation and resists cracking of the interfacial layer.

References
1. A. N. Pestryakov, A. A. Fyodorov, V. A. Shurov, M. S. Gaisinovich, and I. V. Fyodorova, *React.Kinet.Catal.Lett.*, 53 [2] 347–352 (1994).
2. A. N. Pestryakov, A. A. Fyodorov, M. S. Gaisinovich, V. P. Shurov, I. V. Fyodorova, and T. A. Gubaykulina, *React.Kinet.Catal.Lett.*, 54 [1] 167–172 (1995).
3. J. R. Kosak. A Novel Fixed Bed Catalyst for the Direct Combination of $H_2$ and $O_2$ to $H_2O_2$, M. G. Scaros and M. L. Prunier, Eds., *Catalysis of Organic Reactions,* Marcel Dekker, Inc. (1995), p115–124.
4. O. Y. Podyacheva, A. A. Ketov, Z. R. Ismagilov, V. A. Ushakov, A. Bos and H. J. Veringa, *React.Kinet.Catal.Lett.*, 60 [2] 243–250 (1997).
5. A. N. Leonov, O. L. Smorygo, and V. K. Sheleg, *React.Kinet.Catal.Lett.*, 60 [2] 259–267 (1997).
6. M. V. Twigg and D. E. Webster. Metal and Coated-Metal Catalysts, A Cybulski and J. A. Moulijn, Eds., *Structured Catalysts and Reactors*, Marcel Dekker, Inc. (1998), p59–90.

SUMMARY OF THE INVENTION

The present invention includes a catalyst that has at least three layers, (1) porous support, (2) buffer layer, (3) interfacial layer, and optionally (4) a catalytically active layer. In some embodiments, the buffer layer, which is disposed between the porous support and the interfacial layer, contains at least two compositionally different sublayers. The buffer layer typically provides a transition of thermal expansion coefficient from the porous support to the interfacial layer thereby reducing thermal expansion stress as the catalyst is heated to and cooled from high operating temperatures. The buffer layer also reduces corrosion and oxidation of the porous support, and minimizes side reactions catalyzed by the surface of the porous support.

The invention also provides a catalyst having a porous support, a buffer layer disposed between the porous support and an interfacial layer; and wherein the catalyst possesses oxidation resistance such that, if it is heated at 580° C. in air for 2500 minutes the catalyst increases in weight by less than 5%. Alternatively, the catalyst may also be characterized by its resistance to flaking during thermal cycling.

The invention further provides a process of converting at least one reactant to at least one product in which the reactant is passed through a reaction chamber containing the catalyst.

The method of the present invention for making the multi-layer catalyst (at least three layers) has the steps of (1) selecting a porous support, (2) depositing a buffer layer on the porous support, (3) depositing an interfacial layer thereon, and optionally (4) depositing a catalytically active layer onto or integral with the interfacial layer; wherein the buffer layer is disposed between the porous support and the interfacial layer. Better results can be obtained where the buffer layer is vapor deposited. The catalytically active layer can be deposited after or during the deposition of the interfacial layer.

Advantages of the present invention, that include a porous support with a buffer layer and an interfacial layer, may include: better match of thermal expansion coefficients and better stability to temperature changes, reduction of side reactions such as coking, desired metal-oxide interactions, strong bonding to a high-surface-area interfacial layer, and enhanced protection of the underlying porous support.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
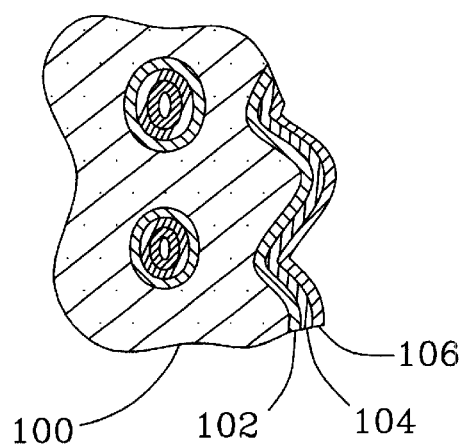
FIG. 1 is an enlarged cross section of a catalyst.

The catalyst of the present invention is depicted in FIG. 1 having a porous support 100, a buffer layer 102, an interfacial layer 104, and, optionally, a catalyst layer 106. Any layer may be continuous or discontinuous as in the form of spots or dots, or in the form of a layer with gaps or holes.

The porous support 100 may be a porous ceramic or a metal foam. Other porous supports suitable for use in the present invention include carbides, nitrides, and composite materials. Prior to depositing the layers, the porous support has a porosity of at least 5% as measured by mercury porosimetry and an average pore size (sum of pore diameters/number of pores) of from 1 $\mu$m to 1000 $\mu$m as measured by optical and scanning electron microscopy. Preferably, the porous support has a porosity of about 30% to about 99%, more preferably 70% to 98%. Preferred forms of porous supports are foams, felts, wads and combinations thereof. Foam is a structure with continuous walls defining pores throughout the structure. Felt is a structure of fibers with interstitial spaces therebetween. Wad is a structure of tangled strands, like steel wool. Less preferably, porous supports may also include other porous media such as pellets and honeycombs, provided that they have the aforementioned porosity and pore size characteristics. The open cells of a metal foam preferably range from about 20 pores per inch (ppi) to about 3000 ppi and more preferably about 40 to about 120 ppi. PPI is defined as the largest number of pores per inch (in isotropic materials the direction of the measurement is irrelevant; however, in anisotrpoic materials, the measurement is done in the direction that maximizes pore number). In the present invention, ppi is measured by scanning electron microscopy. It has been discovered that a porous support provides several advantages in the present invention including low pressure drop, enhanced thermal conductivity over conventional ceramic pellet supports, and ease of loading/unloading in chemical reactors.

The buffer layer 102 has different composition and/or density than both the support and the interfacial layers, and preferably has a coefficient of thermal expansion that is intermediate the thermal expansion coefficients of the porous support and the interfacial layer. Preferably, the buffer layer is a metal oxide or metal carbide. Applicants discovered that vapor-deposited layers are superior because they exhibit better adhesion and resist flaking even after several thermal cycles. More preferably, the buffer layer is $Al_2O_3$, $TiO_2$, and $ZrO_2$ or combinations thereof. More specifically, the $Al_2O_3$ is $\alpha$-$Al_2O_3$, $\gamma$-$Al_2O_3$ and combinations thereof. $\alpha$-$Al_2O_3$ is more preferred because of its excellent resistance to oxygen diffusion. Therefore, it is expected that resistance against high temperature oxidation can be improved with alumina coated on the porous support 100. The buffer layer may also be formed of two or more compositionally different sublayers. When the porous support 100 is metal, for example a stainless steel foam, a preferred embodiment has a buffer layer 102 formed of two compositionally different sub-layers (not shown). The first sublayer (in contact with the porous support 100) is preferably $TiO_2$ because it exhibits good adhesion to the porous metal support 100. The second sublayer is preferably $\alpha$-$Al_2O_3$ which is placed upon the $TiO_2$. In a preferred embodiment, the $\alpha$-$Al_2O_3$ sublayer is a dense layer that provides excellent protection of the underlying metal surface. A less dense, high surface area alumina interfacial layer may then be deposited as support for a catalytically active layer.

Typically the porous support 100 has a thermal coefficient of expansion different from that of the interfacial layer 104. Accordingly, for high temperature catalysis (T>150° C.) a buffer layer 102 is needed to transition between the two coefficients of thermal expansion. The thermal expansion coefficient of the buffer layer can be tailored by controlling the composition to obtain an expansion coefficient that is compatible with the expansion coefficients of the porous support and interfacial layers. Another advantage of the buffer layer 102 is that it provides resistance against side reactions such as coking or cracking caused by a bare metal foam surface. For chemical reactions which do not require large surface area supports such as catalytic combustion, the buffer layer 102 stabilizes the catalyst metal due to strong metal to metal-oxide interaction. In chemical reactions which require large surface area supports, the buffer layer 102 provides stronger bonding to the high surface area interfacial layer 104. Preferably, the buffer layer is free of openings and pin holes—this provides superior protection of the underlying support. More preferably, the buffer layer is nonporous. The buffer layer has a thickness that is less than one half of the average pore size of the porous support. Preferably, the buffer layer is between about 0.05 and about 10 $\mu$m thick, more preferably, less than 5 $\mu$m thick. The buffer layer should exhibit thermal and chemical stability at elevated temperatures.

The interfacial layer 104 can be comprised of nitrides, carbides, sulfides, halides, metal oxides, carbon and combinations thereof. The interfacial layer provides high surface area and/or provides a desirable catalyst-support interaction for supported catalysts. The interfacial layer can be comprised of any material that is conventionally used as a catalyst support. Preferably, the interfacial layer is a metal oxide. Examples of metal oxides include, but are not limited, to γ-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer 104 may serve as a catalytically active layer without any further catalytically active material deposited thereon. Usually, however, the interfacial layer 104 is used in combination with catalytically active layer 106. The interfacial layer may also be formed of two or more compositionally different sublayers. The interfacial layer has a thickness that is less than one half of the average pore size of the porous support. Preferably, the interfacial layer thickness ranges from about 0.5 to about 100 µm, more preferably from about 1 to about 50 µm. The interfacial layer can be either crystalline or amorphous and preferably has a BET surface area of at least 1 $m^2$/g.

The catalytically active material 106 (when present) can be deposited on the interfacial layer 104. Alternatively, a catalytically active material can be simultaneously deposited with the interfacial layer. The catalytically active layer (when present) is typically intimately dispersed on the interfacial layer. That the catalytically active layer is "disposed on" or "deposited on" the interfacial layer includes the conventional understanding that microscopic catalytically active particles are dispersed: on the support layer (i.e., interfacial layer) surface, in crevices in the support layer, and in open pores in the support layer. The catalytically active layer may include: catalyst metals, including but not limited to, noble metal, transition metal and combinations thereof; metal oxides, including but not limited to, oxides of alkali elements, alkaline earth elements, boron, gallium, germanium, arsenic, selenium, tellurium, thallium, lead, bismuth, polonium, magnesium, titanium, vanadium, chromium, manganese, iron, nickel, cobalt, copper, zinc, zirconium, molybdenum, tin, calcium, aluminum, silicon, lanthanum series element(s), and combinations thereof; composites; zeolite(s); nitrides; carbides; sulfides; halides; phosphates; and combinations of any of the above.

The catalyst (including porous support, buffer layer, interfacial layer and catalytically active layer, if present) preferably is sized to fit within a reaction chamber. The catalyst is preferred to have contiguous porosity such that molecules can diffuse through the catalyst. In this preferred embodiment, the catalyst can be disposed in a reaction chamber such that gases will flow substantially through the catalyst rather than around it. In a preferred embodiment, the cross-sectional area of the catalyst occupies at least 80%, more preferably at least 95% of the cross-sectional area of the reaction chamber. In preferred embodiments, the catalytically active material is distributed on surfaces throughout catalyst such that reactants passing through the catalyst can react anywhere along the passage through the catalyst; this is a significant advantage over pellet-type catalysts that have a large volume of unused space or catalytically ineffectively used space in the pellet's interior. The inventive catalyst is also superior over powders because packed powders may cause a severe pressure drop.

Catalysts of the present invention can also be characterized by the properties they exhibit. Factors that can be controlled to affect these properties include: selection of the porous support, buffer, interfacial, and catalytically active layers; gradation of thermal expansion coefficients, crystallinity, metal-support interactions, deposition techniques and other factors as are apparent in view of the descriptions herein. Use of a buffer layer combined with routine experimentation utilizing these factors allows the production of catalysts for catalyzing a variety of chemical reactions. Preferred embodiments of the catalysts of the present invention exhibit one or more of the following properties: (1) adhesion—after 3 thermal cycles in air, the catalyst exhibits less than 2% (by area) of flaking as viewed by SEM (scanning electron microscope) analysis; (2) oxidation resistance. After heating at 580° C. in air for 2500 minutes, the catalyst increases in weight by less than 5%, more preferably less than 3%; still more preferably, after heating at 750° C. in air for 1500 minutes, the catalyst increases in weight by less than 0.5%. Weight gain is measured by thermal gravity analysis (TGA). Each thermal cycle consists of heating from room temperature to 600° C. in air at a heating rate of 10° C./min, maintaining the temperature at 600° C. for 3000 minutes, and cooling at a rate of 10° C./min. The catalyst preferably has a surface area, as measured by BET, of greater than about 0.5 $m^2$/g, more preferably greater than about 2.0 $m^2$/g.

The invention further provides a catalytic process comprising passage of at least one reactant into a reaction chamber comprising the inventive catalyst, conversion of said at least one reactant into at least one product, and passage of the product out of the reaction chamber. In a preferred embodiment, the catalytic process is conducted in a apparatus having microchannels. Examples of suitable microchannel apparatus and various process related factors are described in U.S. Pat. Nos. 5,611,214, 5,811,062, 5,534,328, 6,129,973, 6,200,536 and U.S. patent applications Ser. Nos. 09/375,610, 09/123,779, B-1479, cofiled U.S. patent application Ser. No. 09/492,246 and E-1664, all of which are incorporated by reference as if reproduced in full below. In another preferred embodiment, the catalyst is a monolith—a single contiguous, yet porous, piece of catalyst or several contiguous pieces that are stacked together (not a bed of packed powder or pellets or a coating on the wall of a microchannel) that can easily be inserted and extracted from a reaction chamber. The piece or stack of catalyst pieces preferably have a width of 0.1 mm to about 2 cm, with a preferred thickness of less than 1 cm, more preferably, about 1 to about 3 mm. The inventive catalyst may provide numerous advantages to catalytic processes such as: chemical stability, stability to repeated thermal cycling, thermal stability, efficient loading and unloading of catalysts, high rates of heat transfer and mass transfer, and maintenance of desired catalytic activity.

The metal surfaces within microchannel apparatus can be coated with either or both the buffer and the interfacial layers. This can be done using any of the processes described herein, preferably by vapor deposition. Preferred coating materials include titania and and 5–10% $SiO_2/Al_2O_3$. The interior surfaces of the reaction chamber, heat exchanger and other surfaces of microchannel apparatus may be coated. In some embodiments, the walls of a reaction chamber can be coated with an optional buffer layer, an interfacial layer, and a catalytically active material—typically the catalytically active material and the interfacial layer combine to form a supported catalyst. Coatings can also be applied to metal walls in tubes and pipes that form connections to or within microchannel apparatus.

Catalytic processes of the present invention include: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanol synthesis, methylation, demethylation, metathesis, nitration, oxidation, partial oxidation, polymerization, reduction, steam and carbon dioxide reforming, sulfonation, telomerization, transesterification, trimerization, water gas shift (WGS), and reverse water gas shift (RWGS).

The method of making the inventive catalyst has the steps of selecting a porous support 100, depositing a buffer layer 102 on the porous support 100 and depositing an interfacial layer 104 thereover. Optionally a catalyst layer 106 may be deposited onto the interfacial layer 104 or both the interfacial layer and the catalyst layer may be simultaneously deposited on the buffer layer 102.

Because metal has web surfaces that are nonporous and smooth, deposition of the buffer layer may be impeded. One way to mitigate this problem is to rough the metal surface via chemical etching. The adhesion of high surface area gamma-alumina supported metal catalysts to metal foam is significantly improved when metal foam is roughed via chemical etching using mineral acid solutions, for example 0.1 to 1M HCl. Roughed web surface also shows improved resistance to the spalling of catalyst layer under thermal cyclings. In a preferred embodiment, wherein a metal foam is used as the porous support 100, the metal foam is etched prior to vapor depositing the buffer layer 102. Etching is preferably with an acid, for example HCl.

Deposition of the buffer layer 102 is preferably by vapor deposition including but not limited to chemical vapor deposition, physical vapor deposition or combinations thereof. Surprisingly, it has been found that vapor deposition, which is typically conducted at high temperatures, results in polycrystalline or amorphous phases that provide good adhesion of the buffer layer to the surface of the porous support. The method is particularly advantageous for adhering a metal oxide buffer layer to a metal porous support. Alternatively, the buffer layer 102 may be obtained by solution coating. For example, the solution coating has the steps of metal surface functionalization via exposing the metal surface to water vapor to form surface hydroxyls, followed by surface reaction and hydrolysis of alkoxides to obtain a coating of metal oxide. This solution coating may be preferred as a lower cost method of depositing the buffer layer 102.

The interfacial layer 104 is preferably formed by vapor or solution deposition using precursors as are known for these techniques. Suitable precursors include organometallic compounds, halides, carbonyls, acetonates, acetates, metals, colloidal dispersions of metal oxides, nitrates, slurries, etc. For example, a porous alumina interfacial layer can be wash-coated with PQ alumina (Nyacol Products, Ashland, Mass.) colloidal dispersion followed by drying in a vacuum oven overnight and calcining at 500° C. for 2 hours.

The catalytically active material can be deposited by any suitable method. For example, catalyst precursors can be deposited on colloidal metal oxide particles and slurry coated on a buffer-coated porous support, then dried and reduced.

EXAMPLE 1

An experiment was conducted to demonstrate certain advantages of the buffer layer of the present invention.

Figure 2A:
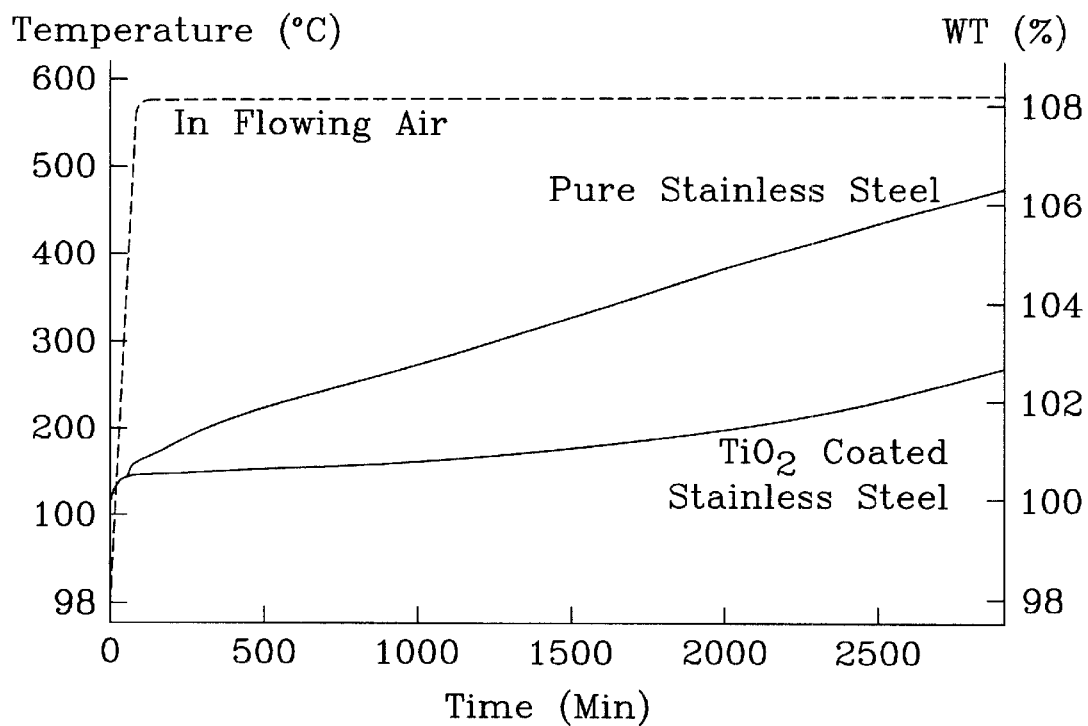
FIG. 2a is a graph of weight gain (via oxidation) versus time for a stainless steel foam (top line) and a stainless steel foam coated with titania (bottom line) at 580° C. (dotted line).
Figure 2B:
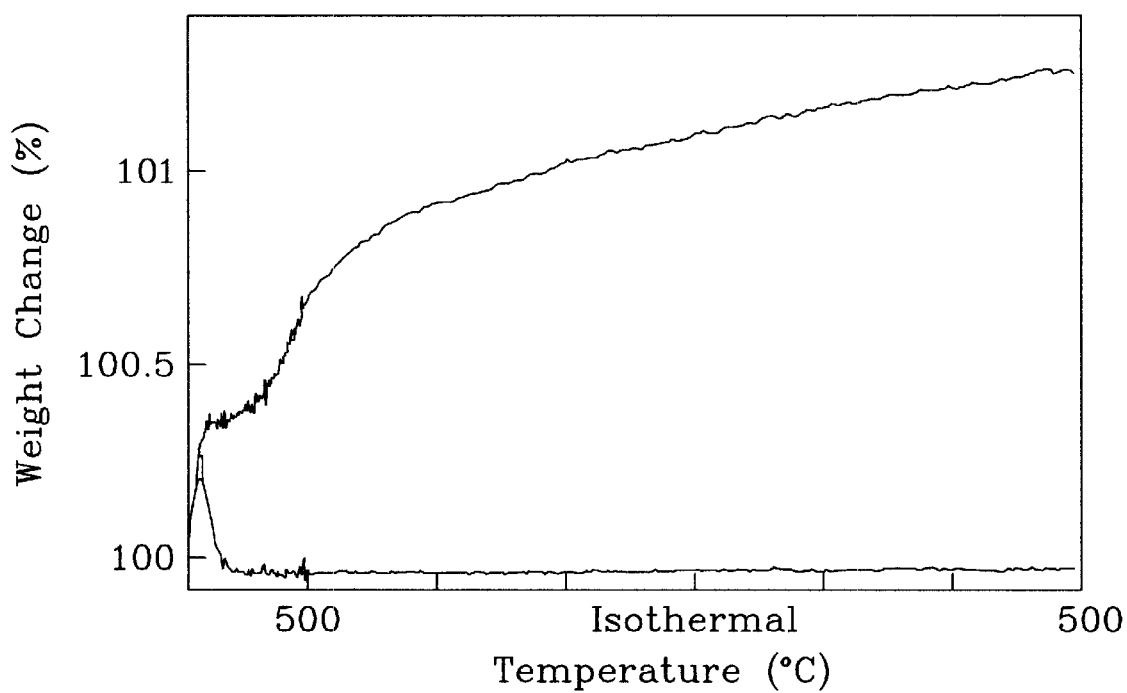
FIG. 2b is a graph of weight gain (via oxidation) versus time for a nickel foam (top line) and a nickel foam coated with titania (bottom line) at 500° C.
Figure 3:
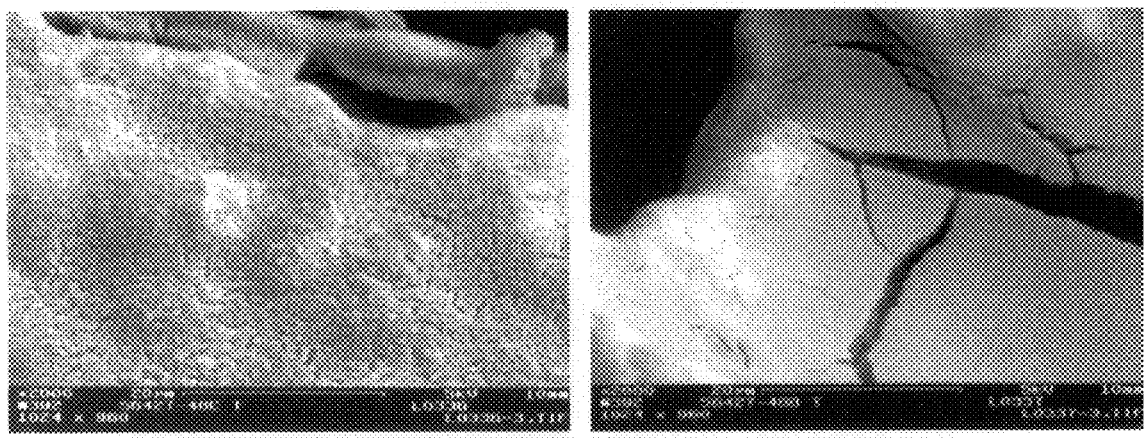
FIG. 3 is a pair of photomicrographs comparing the effect of thermal cycling on a stainless steel foam that has a titania buffer layer and an alumina wash coat (left) and a stainless steel foam that has an alumina wash coat (no buffer layer, right).

An unetched stainless steel foam (Astromet, Cincinnati Ohio) was coated with 1000 Angstroms $TiO_2$ via chemical vapor deposition. Titanium isopropxide (Strem Chemical, Newburyport, Mass.) was vapor deposited at a temperature ranging from 250 to 800° C. at a pressure of 0.1 to 100 torr. Titania coatings with excellent adhesion to the foam were obtained at a deposition temperature of 600° C. and a reactor pressure of 3 torr. SEM (scanning electron microscope) analysis showed that the stainless steel foam supported gamma-alumina with a $TiO_2$ buffer layer did not show spalling after several (3) thermal cycles from room temperature to 600° C. In a control experiment with a stainless steel foam support coated with gamma-alumina without the $TiO_2$ buffer layer, severe flaking or spalling of the gamma alumina under the identical testing conditions was observed. Resistance to high temperature oxidation is shown in FIGS. 2a and 2b As can be seen in the FIG. 2a, uncoated steel foam rapidly oxidized (as shown by the weight gain, i.e., thermal gravity, values) while the titania coated steel oxidized relatively slowly. As can be seen in the FIG. 2b, uncoated nickel foam oxidized, while, under the same conditions, the titania coated nickel foam showed zero (i.e., undetectable levels of) oxidation.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A catalyst comprising a porous metal support, a buffer layer, an interfacial layer, and a catalytically active layer on the surface; wherein the porous metal support has an average pore size of from 1 $\mu$m to 1000 $\mu$m; wherein the porous metal support is selected from the group consisting of honeycomb, foam, felt, and wad; wherein the buffer layer is disposed between the porous support and the interfacial layer, and the interfacial layer is disposed between the catalytically active layer and the buffer layer;

and wherein the interfacial layer comprises a material selected from the group consisting of nitrides, carbides, sulfides, halides and carbon.

2. The catalyst of claim 1 wherein the catalyst possesses thermal cycling stability such that, if exposed to 3 thermal cycles in air, the catalyst exhibits less than 2% flaking.

3. The catalyst of claim 1 wherein the catalyst possesses oxidation resistance such that, if it is heated at 580° C. in air for 2500 minutes the catalyst increases in weight by less than 5%.

4. The catalyst of claim 1 wherein the catalyst possesses oxidation resistance such that, if it is heated at 750° C. in air for 1500 minutes, the catalyst increases in weight by less than 0.5%.

5. The catalyst of claim 1 wherein the catalytically active layer is distributed on surfaces throughout the catalyst such that reactants passing through the catalyst can react anywhere along the passage through the catalyst.

6. The catalyst of claim 1 wherein said buffer layer is nonporous.

7. The catalyst of claim 1 wherein the interfacial layer has a BET surface area of at least 1 $m^2$/g.

8. The catalyst of claim 1 having oxidation resistance such that if it is heated at 750° C. in air for 1500 minutes the catalyst increases in weight by less than 0.5%.

9. The catalyst of claim 1 wherein the porous support comprises a foam, felt, wad or combination thereof.

10. The catalyst of claim 1 wherein the porous metal support has an average pore size of from 1 to 500 μm.

11. The catalyst of claim 1 wherein the interfacial layer has a thickness that ranges from 1 to 50 μm.

12. A catalyst comprising a porous metal support, a buffer layer, and an interfacial layer; wherein the porous metal support has an average pore size of from 1 μm to 1000 μm; wherein the porous metal support is selected from the group consisting of, foam, felt, and wad; wherein the buffer layer is comprised of at least two compositionally different sub-layers; and wherein the buffer layer is disposed between the porous support and the interfacial layer.

13. The catalyst of claim 12, further comprising a catalytically active layer upon the interfacial layer.

14. The catalyst of claim 12 wherein said at least two sublayers comprise a first sublayer in contact with the porous support composed of $TiO_2$, and a second sublayer composed of $\alpha$-$Al_2O_3$.

15. The catalyst of claim 14 wherein the interfacial layer comprises a layer of high surface area alumina that is less dense than the second sublayer.

16. The catalyst of claim 15 further comprising a catalyst disposed on the interfacial layer.

17. The catalyst of claim 12 wherein the interfacial layer consists of a metal oxide.

18. The catalyst of claim 12 wherein the interfacial layer can serve as a catalytically active layer without any further catalytically active material deposited thereon.

19. The catalyst of claim 12 wherein the interfacial layer comprises at least two compositionally different sub-layers.

20. The catalyst of claim 12 wherein the porous support has a porosity in the range of 70 to 98%.

21. The catalyst of claim 12 wherein the porous support comprises a foam, felt, wad or combination thereof.

22. The catalyst of claim 12 wherein the interfacial layer has a thickness that ranges from 1 to 50 μm.

23. A catalyst comprising a porous metal support, a buffer layer, and an interfacial layer; wherein the porous metal support has an average pore size of from 1 μm to 1000 μm; wherein the porous metal support comprises a foam, felt, wad or combination thereof; wherein the buffer layer is disposed between the porous support and the interfacial layer; and wherein the catalyst possesses thermal cycling stability such that, if exposed to 3 thermal cycles in air, the catalyst exhibits less than 2% flaking.

24. The catalyst of claim 23 wherein the porous support is a metal; and further wherein the catalyst possesses oxidation resistance such that, if it is heated at 580° C. in air for 2500 minutes the catalyst increases in weight by less than 5%.

25. The catalyst of claim 24 wherein the buffer layer is between 0.05 and 10 μm thick.

26. The catalyst of claim 23 wherein the catalyst is a monolith having a width of 0.1 mm to about 2 cm and a thickness of less than 1 cm.

27. The catalyst of claim 23 wherein the porous support has a porosity in the range of 70 to 98%.

28. The catalyst of claim 23 wherein the porous metal support has an average pore size of from 1 to 500 μm.

29. The catalyst of claim 23 wherein the interfacial layer has a thickness that ranges from 1 to 50 μm.

30. A method of making a catalyst comprising the steps of:
   selecting a porous metal support selected from the group consisting of honeycomb, foam, felt, and wad;
   vapor depositing a buffer layer on said porous support;
   depositing an interfacial layer on said buffer layer; and
   wherein a catalytically active material is simultaneously deposited with the interfacial layer.

31. The method of claim 30 wherein said buffer layer is titania.

32. The method of claim 30 wherein the interfacial layer is deposited from solution.

33. The method of claim 30 wherein the step of vapor depositing comprises chemical vapor depositing.

34. The method of claim 33 wherein the support comprises a metal foam and wherein the chemical vapor deposition is conducted in a temperature range of 250 to 800° C.

35. The method of claim 33 wherein a precursor for the chemical vapor deposition is selected from the group consisting of: organometallic compounds, halides, carbonyls, acetonates, and acetates.

36. The method of claim 30 wherein the step of vapor depositing a buffer layer comprises the steps of: vapor depositing a $TiO_2$ layer; and vapor depositing a dense alumina layer over the $TiO_2$ layer; and wherein the step of depositing an interfacial layer comprises depositing a less dense, high surface area alumina layer over the dense alumina layer.

37. The method of claim 30 wherein the porous support comprises a metal foam and the catalyst has a surface area of greater than 2.0 g per cubic centimeter.

38. The method of claim 30 wherein the porous support comprises a metal foam and the metal foam is etched prior to vapor depositing the buffer layer.

39. The method of claim 30 wherein the support comprises a structure selected from the group consisting of honeycomb, foam, felt, and wad; and the catalyst possesses oxidation resistance such that, if it is heated at 750° C. in air for 1500 minutes the catalyst increases in weight by less than 0.5%.

40. The method of claim 30 wherein the porous support has a porosity in the range of 70 to 98%.

41. The method of claim 30 wherein the porous support comprises a foam, felt, wad, or combination thereof.

42. The method of claim 41 wherein the step of vapor depositing comprises chemical vapor depositing.

* * * * *